US008004811B2

(12) United States Patent
Chen et al.

(10) Patent No.: US 8,004,811 B2
(45) Date of Patent: Aug. 23, 2011

(54) POWER STRIP HAVING SURGE PROTECTIVE CIRCUIT

(75) Inventors: Kuang-Che Chen, Taipei (TW); Yi-Te Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 417 days.

(21) Appl. No.: 12/140,765

(22) Filed: Jun. 17, 2008

(65) Prior Publication Data

US 2009/0207540 A1 Aug. 20, 2009

(30) Foreign Application Priority Data

Feb. 14, 2008 (CN) .......................... 2008 1 0005639

(51) Int. Cl.
*H02H 3/22* (2006.01)
*H02H 1/04* (2006.01)
*H02H 9/06* (2006.01)

(52) U.S. Cl. ........................... 361/118; 361/56; 361/111

(58) Field of Classification Search .................. 361/118, 361/56, 111, 117
See application file for complete search history.

(56) References Cited

U.S. PATENT DOCUMENTS

| | | | | |
|---|---|---|---|---|
| 2,843,829 | A * | 7/1958 | Slate | 336/200 |
| 3,577,032 | A * | 5/1971 | McStrack et al. | 315/36 |
| 3,793,535 | A * | 2/1974 | Chowdhuri | 361/111 |
| 3,934,175 | A * | 1/1976 | Clark | 361/56 |
| 4,259,705 | A * | 3/1981 | Stifter | 361/56 |
| 4,563,720 | A * | 1/1986 | Clark | 361/56 |
| 4,628,394 | A * | 12/1986 | Crosby et al. | 361/56 |
| 4,630,163 | A * | 12/1986 | Cooper et al. | 361/56 |
| 5,243,648 | A * | 9/1993 | Gilardi et al. | 380/252 |
| 5,625,521 | A * | 4/1997 | Luu | 361/111 |
| 6,288,917 | B1 * | 9/2001 | Redburn et al. | 363/39 |
| 7,443,646 | B2 * | 10/2008 | Pozzuoli | 361/111 |

* cited by examiner

*Primary Examiner* — Rexford Barnie
*Assistant Examiner* — Zeev Kitov
(74) *Attorney, Agent, or Firm* — Kirton & McConkie; Evan R. Witt

(57) ABSTRACT

The present invention provides a power strip having a surge protective circuit. When a surge is inputted into the power strip, the surge is subject to two-stage suppressions so as to protect the electrical appliances which are electrically connected to the power strip. The surge protective circuit of the power strip includes a first surge protective device, a buffer conductive device and a second surge protective device. The buffer conductive device is relatively small-sized and cost-effective in comparison with the bulky inductor used in conventional power strip.

3 Claims, 4 Drawing Sheets

POWER STRIP HAVING SURGE PROTECTIVE CIRCUIT

FIELD OF THE INVENTION

The present invention relates to a power strip, and more particularly to a power strip having a surge protective circuit.

BACKGROUND OF THE INVENTION

Generally, conventional power strips are susceptible to transient surge voltages resulting from lightning strike. For preventing the transient surge voltages from damaging the electrical appliances which are electrically connected to the power strip, the conventional power strip usually has a surge protective circuit for preventing damage of electrical appliances.

Recently, as the requirements for electrical safety of electrical appliances become more stringent, stringent safety regulations associated with surge protective circuit are provided. Underwriters Laboratories Standard for Safety for Transient Voltage (UL 1449) is the primary safety standard for testing surge protective circuit. The second edition of UL 1449 proposes a lightning strike simulation test. In accordance with the lightning strike simulation test, when a voltage of 6,000 volts and a current of 500 amperes are inputted into an electrical appliance having a surge protective circuit, the surge protective circuit should exhibit a clamping voltage less than 330 volts.

On Sep. 29, 2006, UL 1449 has recently been revised, and will be introduced as a third edition. In accordance with the lightning strike simulation test proposed in the third edition of UL 1449, the surge protective circuit should also exhibit a clamping voltage less than 330 volts even if the test condition become more stringent (i.e. 6,000 volts, 3,000 amperes). Experiments demonstrate that most surge protective circuits meeting the requirements of the second edition of UL 1449 exhibit a clamping voltage larger than 400 volts. In other words, the surge protective circuits of the conventional power strips fail to meet the requirements of the third edition of UL 1449.

For meeting the requirements of the third edition of UL 1449, a power strip with a multi-stage surge protective circuit has been disclosed. FIG. 1 is a schematic view illustrating a power strip 10 with a multi-stage surge protective circuit 1031 according to the prior art. The power strip 10 further includes a plug device 101, a conducting line 102 and a power strip main body 103. The plug device 101 includes three pins 1011. The power strip main body 103 includes the surge protective circuit 1031 and a plurality of electrical sockets 1032.

When a surge occurs, the surge is inputted into the plug device 101 through any of the three pins 1011 and then transmitted to the power strip main body 103 through the conducting line 102. After the surge is suppressed by the surge protective circuit 1031 in multiple stages, the electricity will be transmitted to the electrical sockets 1032 so as to protect the electrical appliances which are electrically connected to the electrical sockets 1032.

Please refer to FIG. 1 again. The surge protective circuit 1031 includes a first surge protective device 10311, an inductor 10312 and a second surge protective device 10313. The first surge protective device 10311 and the second surge protective device 10313 are used to suppress the surge for the first and second times, respectively. The inductor 10312 is used for conducting the surge. Examples of the first surge protective device 10311 and the second surge protective device 10313 include metal oxide varistors (MOVs), gas discharge tubes (GDTs) or transient voltage suppressors (TVSs). The surge protective circuit 1031 used in the power strip 10, however, still has some drawbacks. For example, the inductor 10312 is not cost-effective and the volume thereof is bulky. Correspondingly, the power strip 10 has high fabricating cost and a large overall volume.

Therefore, there is a need of providing a power strip having a surge protective circuit to meet the requirements of the third edition of UL 1449 while having the advantages of small size, cost-effectiveness and industrial utility.

SUMMARY OF THE INVENTION

It is an object of the present invention to provide a power strip having a surge protective circuit, in which the surge is suppressed in multiple stages so as to protect the electrical appliances which are electrically connected to the power strip.

Another object of the present invention provides a power strip having a surge protective circuit, in which the power strip has the advantages of small size and cost-effectiveness.

In accordance with an aspect of the present invention, there is provided a power strip having a surge protective circuit for suppressing a surge and protecting an electrical appliance which is connected to the power strip. The power strip includes a plug device and a power strip main body. The plug device includes a plurality of pins to be inserted into a power socket. The power strip main body includes a first surge protective device, a buffer conductive device, a second surge protective device and a plurality of electrical sockets. The first surge protective device is connected to the plug device for initially suppressing the surge. The buffer conductive device is connected to the first surge protective device for providing a buffer conductive path for delaying the duration of transferring the surge. The second surge protective device is connected to the buffer conductive device for further suppressing the surge. The electrical sockets are connected to the second surge protective device and the electrical appliance.

In an embodiment, the buffer conductive device is a conductive coil.

In an embodiment, the buffer conductive device is a conducting wire wound around the power strip main body.

In an embodiment, the buffer conductive device is a printed circuit board having a spiral conductive trace thereon.

Preferably, the first surge protective device is a metal oxide varistor (MOV), a gas discharge tube (GDT) or a transient voltage suppressor (TVS).

Preferably, the second surge protective device is a metal oxide varistor (MOV), a gas discharge tube (GDT) or a transient voltage suppressor (TVS).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
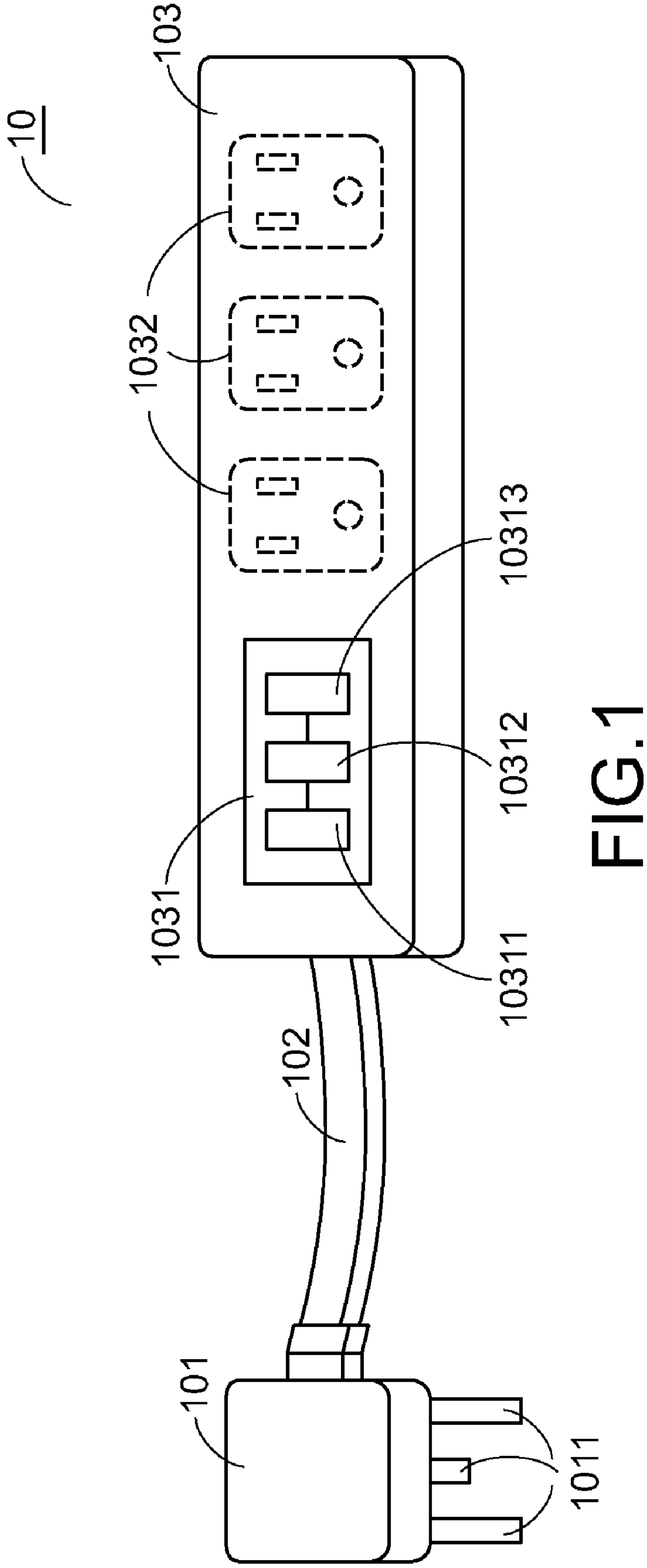
FIG. 1 is a schematic view illustrating a power strip with a multi-stage surge protective circuit according to the prior art.
Figure 2:
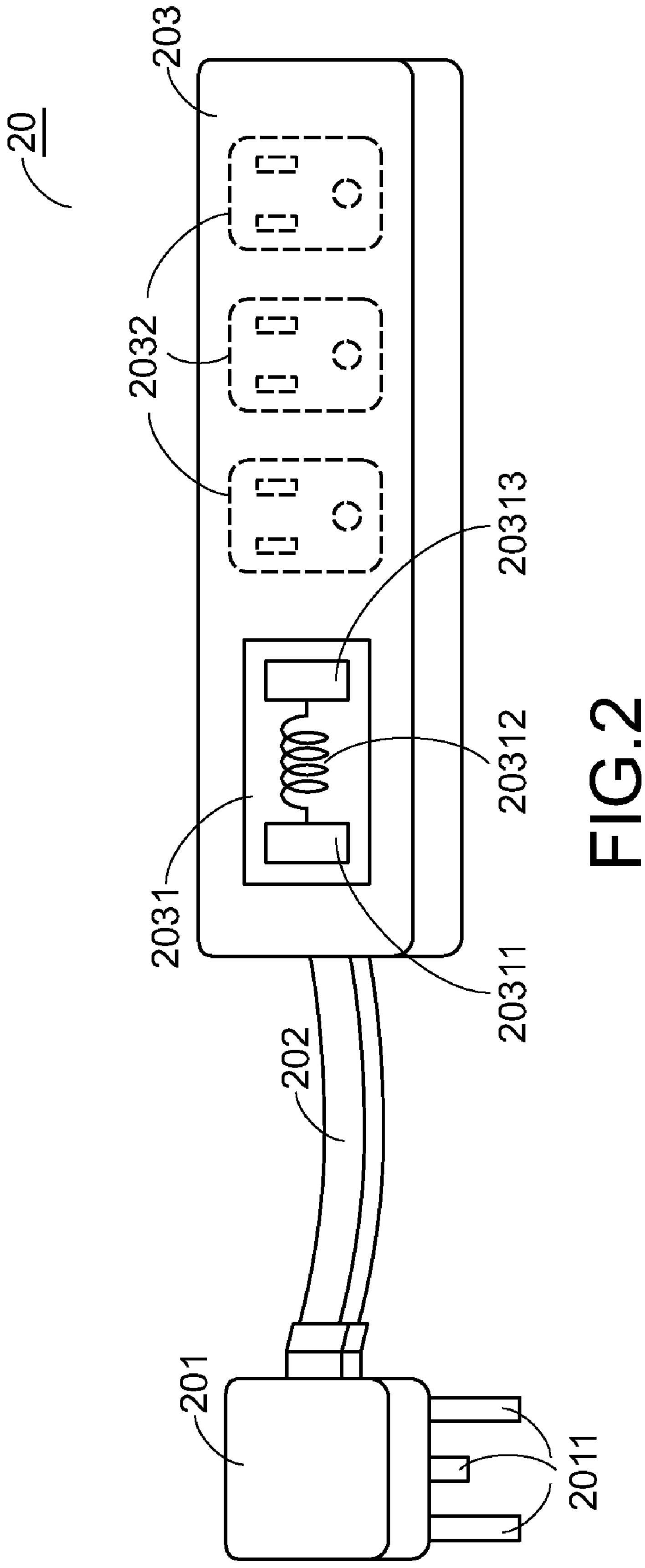
FIG. 2 is a schematic view illustrating a power strip having a surge protective circuit according to a first preferred embodiment of the present invention.

FIG. 2 is a schematic view illustrating a power strip having a surge protective circuit according to a first preferred embodiment of the present invention. As shown in FIG. 2, the power strip 20 includes a plug device 201, a conducting line 202 and a power strip main body 203. The plug device 201 includes a plurality of pins 2011. The power strip main body 203 includes a surge protective circuit 2031 and a plurality of electrical sockets 2032. In this embodiment, the surge protective circuit 2031 includes a first surge protective device 20311, a buffer conductive device 20312, and a second surge protective device 20313. An exemplary buffer conductive device 20312 is a conductive coil. Examples of the first surge protective device 20311 and the second surge protective device 20313 include but are not limited to metal oxide varistors (MOVs), gas discharge tubes (GDTs) or transient voltage suppressors (TVSs). It is preferred that the first surge protective device 20311 and the second surge protective device 20313 are metal oxide varistors.

Please refer to FIG. 2 again. An end of the conducting line 202 is connected to the plug device 201. The other end of the conducting line 202 is connected to the power strip main body 203. That is, the other end of the conducting line 202 is connected to the first surge protective device 20311 of the surge protective circuit 2031. Both ends of the buffer conductive device 20312 are respectively connected to the first surge protective device 20311 and the second surge protective device 20313. The electrical sockets 2032 are electrically connected to the second surge protective device 20313.

Please refer to FIG. 2 again. During operation of the power strip 20, the pins 2011 of the plug device 201 are inserted into a power socket (no shown) for receiving electricity. The electricity offered from the power socket is successively transmitted through the plug device 201, the conducting line 202, the first surge protective device 20311, the buffer conductive device 20312, the second surge protective device 20313 and the electrical sockets 2032 to the electrical appliances (not shown) which are electrically connected to the electrical sockets 2032.

When a surge occurs, the surge is inputted into the plug device 201 through the pins 2011 and then transmitted to the surge first surge protective device 20311 through the conducting line 202. Next, the surge flows through the first surge protective device 20311 such that the surge is subject to a first stage suppression. Next, the surge flows through the buffer conductive device 20312 such that the buffer conductive device 20312 provides a buffer conductive path for delaying the duration of transferring the surge. After the surge is transmitted to the second surge protective device 20313, the second surge protective device 20313 is enabled to perform a second stage suppression on the surge.

Since the surge is sufficiently suppressed by the two-stage suppressions when the surge reaches the electrical sockets 2032, the power strip 20 can meet the requirements of the third edition of UL 1449. That is, the surge protective circuit 2031 exhibits a clamping voltage less than 330 volts according to the test proposed by the third edition of UL 1449. As a consequence, the surge protective circuit 2031 can prevent the electrical appliances connected to the power strip 20 from being damaged by the surge. It is noted that, however, those skilled in the art will readily observe that numerous modifications and alterations may be made while retaining the teachings of the invention. For example, the concept of using two surge protective devices to suppress the surge in two-stage suppressions can be expanded to three-stage or multi-stage suppressions. Accordingly, the above disclosure should be limited only by the bounds of the following claims.

In accordance with a key feature of the present invention, the use of the buffer conductive device 20312 can provide a buffer conductive path for delaying the duration of transferring the surge from the first surge protective device 20311 to the second surge protective device 20313. As a consequence, the second surge protective device 20313 can be certainly enabled to perform further suppression on the surge. Moreover, since the buffer conductive device 20312 is a conductive coil formed by spirally winding a metallic wire, the buffer conductive device 20312 is small-sized and cost-effective in comparison with the bulky inductor used in the surge protective circuit of the conventional power strip. As shown in FIG. 2, only a single conductive coil is referred as the buffer conductive device 20312 in the drawings for brevity. It is noted that, however, those skilled in the art will readily observe that the number of conductive coils can be varied according to the number of pins 2011 of the plug device 201.

Figure 3:
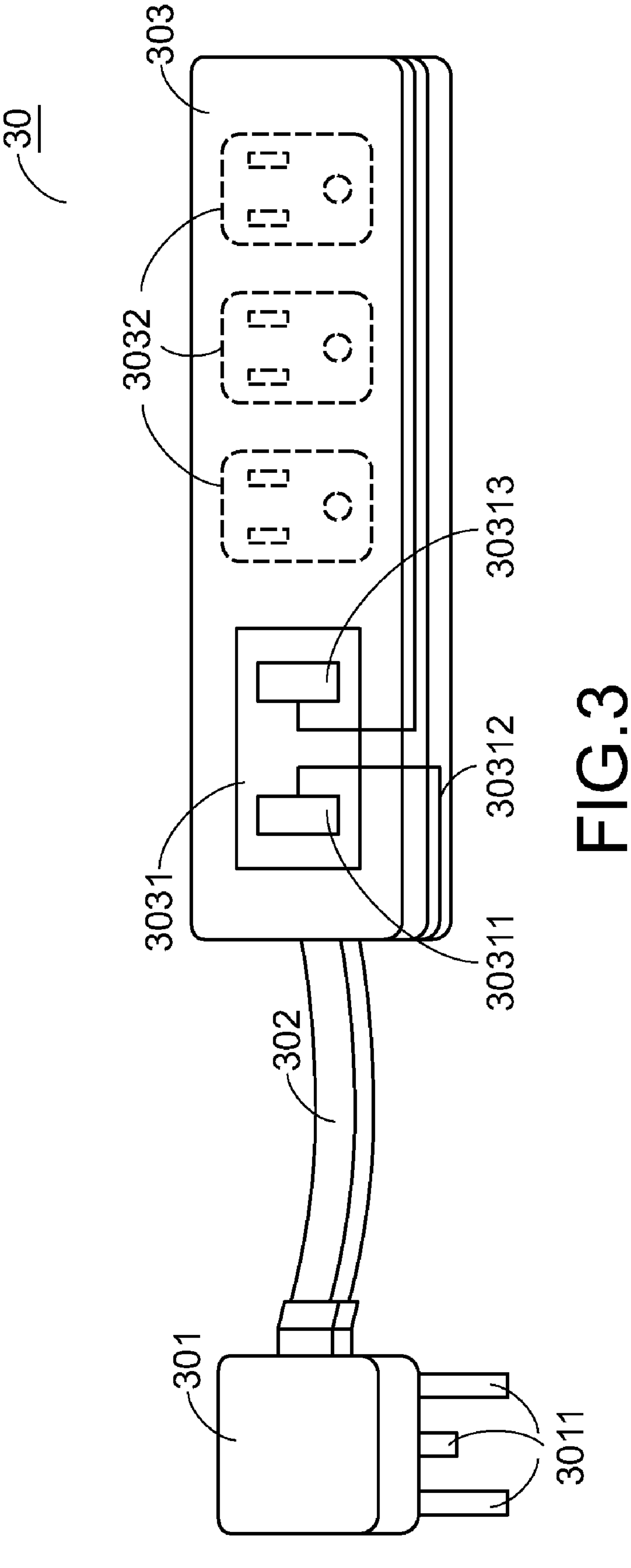
FIG. 3 is a schematic view illustrating a power strip having a surge protective circuit according to a second preferred embodiment of the present invention.

FIG. 3 is a schematic view illustrating a power strip having a surge protective circuit according to a second preferred embodiment of the present invention. As shown in FIG. 3, the power strip 30 includes a plug device 301, a conducting line 302 and a power strip main body 303. The plug device 301 includes a plurality of pins 3011. The power strip main body 303 includes a surge protective circuit 3031 and a plurality of electrical sockets 3032. In this embodiment, the surge protective circuit 3031 includes a first surge protective device 30311, a buffer conductive device 30312, and a second surge protective device 30313. This embodiment is distinguished from the first preferred embodiment in that the buffer conductive device 30312 is a conducting wire wound around the power strip main body 303 and both ends thereof are respectively coupled to the first surge protective device 30311 and the second surge protective device 30313. Such a design can further save the space to be occupied by the buffer conductive device 30312 in the surge protective circuit 3031. Consequently, the overall volume of the power strip main body 303 is reduced. It is noted that, however, those skilled in the art will readily observe that numerous modifications and alterations of winding the buffer conductive device 30312 around the power strip main body 303 may be made while retaining the teachings of the invention. The operation principles of other components included in the power strip of this embodiment are similar to those shown in FIG. 2, and are not redundantly described herein.

Figure 4:
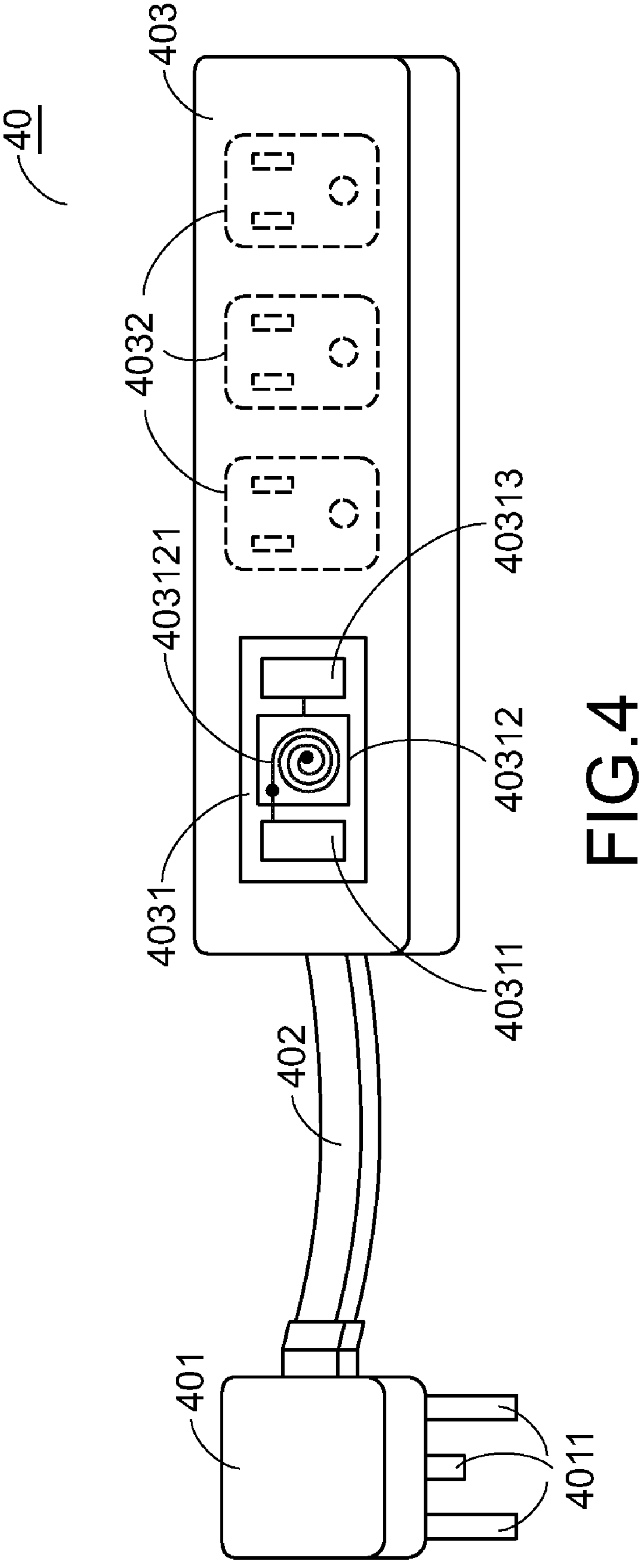
FIG. 4 is a schematic view illustrating a power strip having a surge protective circuit according to a third preferred embodiment of the present invention.

FIG. 4 is a schematic view illustrating a power strip having a surge protective circuit according to a third preferred embodiment of the present invention. As shown in FIG. 4, the power strip 40 includes a plug device 401, a conducting line 402 and a power strip main body 403. The plug device 401 includes a plurality of pins 4011. The power strip main body 403 includes a surge protective circuit 4031 and a plurality of electrical sockets 4032. In this embodiment, the surge protective circuit 4031 includes a first surge protective device 40311, a buffer conductive device 40312, and a second surge protective device 40313. This embodiment is distinguished from the first and second preferred embodiments in that the buffer conductive device 40312 is a printed circuit board having a spiral conductive trace 403121 thereon and both ends of the conductive trace 403121 are respectively coupled to the first surge protective device 40311 and the second surge protective device 40313. It is noted that, however, those skilled in the art will readily observe that the conductive trace 403121 on the printed circuit board is not restricted to the spiral form. The operation principles of other components included in the power strip of this embodiment are similar to those shown in FIGS. 2 and 3, and are not redundantly described herein.

From the above description, the surge protective circuit of the power strip of the present invention has a buffer conductive device in replace of the inductor used in the conventional power strip. Since the buffer conductive device contained is relatively small-sized and cost-effective in comparison with the bulky inductor, the power strip has reduced overall volume and reduced fabricating cost. Moreover, the surge is suppressed in multiple stages by the surge protective circuit of the power strip of the present invention and thus the power strip of the present invention can meet the requirements of the third edition of UL 1449. As a result, the power strip of the present invention has enhanced industrial utility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power strip having a surge protective circuit for suppressing a surge and protecting an electrical appliance which is connected to said power strip, said power strip comprising:

a plug device having multiple pins to be inserted into a power socket; and a power strip main body comprising a first surge protective device, a buffer conductive device, a second surge protective device and a plurality of electrical sockets, wherein the first surge protective device is connected to the plug device for initially suppressing said surge, said buffer conductive device is connected to said first surge protective device for providing a buffer conductive path for delaying the duration of transferring said surge, said second surge protective device is connected to said buffer conductive device for further suppressing said surge, and said plurality of electrical sockets are connected to said second surge protective device and said electrical appliance, wherein said buffer conductive device is a conducting wire wound around said power strip main body.

2. The power strip according to claim 1 wherein said first surge protective device is a metal oxide varistor (MOV), a gas discharge tube (GDT) or a transient voltage suppressor (TVS).

3. The power strip according to claim 1 wherein said second surge protective device is a metal oxide varistor (MOV), a gas discharge tube (GDT) or a transient voltage suppressor (TVS).

* * * * *